US008462597B2

(12) United States Patent
Hayner et al.

(10) Patent No.: US 8,462,597 B2
(45) Date of Patent: Jun. 11, 2013

(54) DECOUPLING TECHNIQUE FOR OPTICAL DISK DRIVE OPTICAL PICKUP UNITS

(75) Inventors: David A. Hayner, Austin, TX (US); Maureen A. Stengler, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 3160 days.

(21) Appl. No.: 10/600,637

(22) Filed: Jun. 20, 2003

(65) Prior Publication Data

US 2004/0257947 A1  Dec. 23, 2004

(51) Int. Cl.
*G11B 7/00* (2006.01)

(52) U.S. Cl.
USPC ..................... 369/44.35; 369/53.28

(58) Field of Classification Search
USPC .......... 369/30.14, 30.15, 44.25, 44.38, 44.29, 369/44.27, 44.34, 47.1, 53.14, 53.28, 44.26, 369/53.35, 44.36, 53.23, 44.13, 53.22, 13.14, 369/13.15, 44.35
See application file for complete search history.

(56) References Cited

U.S. PATENT DOCUMENTS

| | | | | |
|---|---|---|---|---|
| 5,177,718 | A * | 1/1993 | Takeuchi ................... | 369/30.15 |
| 5,627,808 | A * | 5/1997 | Hajjar et al. .............. | 369/44.32 |
| 5,970,032 | A * | 10/1999 | Ikeda et al. ............... | 369/44.29 |
| 6,298,019 | B1 * | 10/2001 | Watanabe et al. ......... | 369/53.23 |
| 6,462,323 | B1 * | 10/2002 | Tagawa ..................... | 369/44.32 |
| 6,714,493 | B1 * | 3/2004 | Kishimoto et al. ........ | 369/44.38 |
| 6,760,285 | B2 * | 7/2004 | Hirashima et al. ........ | 369/44.25 |
| 2002/0110057 | A1 | 8/2002 | Kadlec et al. | |
| 2002/0136112 | A1 | 9/2002 | Kadlec et al. | |
| 2002/0141302 | A1 | 10/2002 | Kadlec et al. | |
| 2002/0150006 | A1 | 10/2002 | Kadlec et al. | |

FOREIGN PATENT DOCUMENTS

| | | |
|---|---|---|
| JP | 61-022447 | 1/1986 |
| JP | 63-131337 | 6/1988 |
| JP | 2001-351256 | 12/2001 |
| JP | 2003-168223 | 6/2003 |

OTHER PUBLICATIONS

Maarten Steinbuch, et al., "Robust Control of a Compact Disc Player," Proceedings of the 31st Conference on Decision and Control, Tucson, AZ, p. 2596-2600, Dec. 1992.

Tetsuo Semba, et al., "Interactions between Servo Loops of an Optical Disk Drive," Jpn. J. Appl. Phys., vol. 36, Part 1, No. 1B, pp. 557-561, Jan. 1997.

Ting-Jen Yeh, et al., "Modeling and Identification of OPTO-Mechanical Coupling and Backlash Nonlinearity in Optical Disk Drives," IEEE Transactions on Consumer Electronics, vol. 46, No. 1, pp. 105-115, Nov. 18, 1999.

Ting-Jen Yeh, et al., "Modeling and Identification of OPTO-Mechanical Coupling and Backlash-Nonlinearity in Optical Disk Drives," Proceedings of the American Control Conference, Chicago, IL, pp. 3076-3080, Jun. 2000.

* cited by examiner

*Primary Examiner* — Tan X Dinh

(57) ABSTRACT

A low-cost technique to improve the performance of optical disk drives is presented. An algorithm is used to decouple electro-mechanical actuators thus compensating for inaccuracies in the control of the actuators. A similar method can be used to decouple the position sensors. Prior art methods treated cross-coupling between focus, tracking and sled control loops as noise and therefore increased the bandwidth of the system, also increasing the cost of the optical disk drive. The present disclosure actively decouples the control loops using a software algorithm to provide better performing optical disk drives. The cross-coupling effects are measured, a decoupling matrix is determined, and the output of the control laws is modified so as to decouple the actuators.

17 Claims, 2 Drawing Sheets

DECOUPLING TECHNIQUE FOR OPTICAL DISK DRIVE OPTICAL PICKUP UNITS

BACKGROUND

1. Field of the Disclosure

The present disclosure relates to optical disk drives and systems having optical disk drives, and, more particularly, to the control of optical disk drives.

2. Description of the Related Art

Optical disk drives are very popular compact storage devices due to their low cost and the high reliability of the optical disk storage. Optical disks have high reliability because there is no wear associated with their repeated use, thus providing write once, read many (WORM) capability. Optical disk drives use transmitted electromagnetic waves, generally in the visible light spectrum, for recording and retrieval of information. Optical disk drives record and detect specific variations in the optical properties of the media surface. The most common optical disk formats include CD, CDLaser ROM, CD-R, CD-RW, DVD-ROM, DVD+RW, DVDRW, DVD-RAM, and 5¼" Magneto Optic.

Data is stored on tracks on the optical disks. Actuators in the optical disk drives must acquire and maintain focus, seek to a given track and then maintain the relative position in a track while data is written or read. Sensors measure the position of an optical pickup unit. The measured position is used to correct any positioning errors.

FIG. 1, labeled prior art, illustrates a portion 100 of an optical disk drive. A sled 102 holds an optical pickup unit (OPU) 104 and moves along sled tracks 106 controlled by a sled motor 108. Sled motor 108 provides coarse movement of sled 102. OPU 104 holds magnets 110 and 112, current carrying wires 114, and coils 116 and 118 for providing fine control of the movement of a lens assembly 105 in OPU 104. By providing current on wires 114, which are coupled to coils 116 and 118, magnetic forces are created that move lens assembly 105 in nearly orthogonal directions. Magnet 110 and coil 116 control the movement of lens assembly 105 in an X direction, herein referred to as a tracking direction. Magnet 112 and coil 118 control the movement of lens assembly 105 in a Z direction, herein referred to as a focus direction. Note that sled 102 and OPU 104 include other devices not shown for simplicity of illustration.

The main control loops of optical disk drive 100 include a coarse (lower frequency) tracking loop to position sled 102 in the vicinity of the desired tracks on the optical media, a focus loop to control the distance between lens assembly 105 and the media, and a fine (higher frequency) tracking loop to lock lens assembly 105 onto the track position. Optical disk drive 100 includes multiple other control loops, for example, a servo loop to control the speed of the spindle.

FIG. 2, labeled prior art, illustrates a system model 200 of one of multiple servo systems of an optical disk drive. Control laws 202 are used to produce, for example, focus commands. Control laws 202 can be analog or digital, include gain factors, digital or analog filtering functions, non-linear and logic operators and the like. In the case of digital control, these control signals can be converted, for example, using a digital to analog converter (DAC), to produce appropriate signals to control, via focus actuators 206, the position of lens assembly 105. Disturbances and noise 208 affect the resulting or actual position of lens assembly 105. A sensor 210 senses the actual position of lens assembly 105 as a measured position. However, disturbances and noise 212 affect the measurement of the position by sensor 110 and result in a measured position that is different than the actual position. The measured position is subtracted from a reference or desired position 214 and input to control laws 202. Control laws 202 are designed to minimize this difference between the measured position and the desired position. Note that due to disturbances and noise 208 and 212, what is commanded is not what actually occurs; and what actually occurs is not what is measured.

System model 200 has been described according to a focus servo system of an optical disk drive. Other servo systems, for example, a tracking servo system, a sled servo system, and the like can have similar system models.

Disturbances and noise 208, 212 come from a variety of sources. Disturbances and noise 208 can be significant and are primarily due to mechanical runnout of the disk, disk warping, imperfections in the physical spacing of the tracks, cross-coupling of the tracking and focus actuators, and external movement or jarring of the optical drive. Disturbances and noise 212 can be due to sensor cross-coupling, A/D converter noise, amplifier (thermal noise), and the like. Disturbances are predominately periodic or predictable in nature with an uncorrelated (noise) component, whereas noise is typically a random process.

Typically, in the prior art, these disturbances can be handled by increasing the control system bandwidth by using higher order digital filter and faster sampling rates. However, this increases the cost of the system, for example, due to the cost of higher performance processors required to execute a larger number of operations at a faster rate. Increasing the control system bandwidth also increases the overall system's sensitivity to small variations (lot-to-lot manufacturing tolerance variations) in the electro-mechanical characteristics of the optical pickup units. This increased sensitivity to manufacturing variations either increases the cost of the optical pickup units to maintain a constant manufacturing yield (via the use of higher quality optical pickup units with lower lot-to-lot variations) or decreases the manufacturing yield of the completed optical disk drive with the original, higher variance optical pickup units.

Better performing optical disk drive control systems are desired that do not increase the cost of the system or reduce manufacturing yields.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

A low-cost technique to improve the performance of optical disk drives is presented. An algorithm is used to decouple the actions of the electro-mechanical actuators, thus compensating for inaccuracies in the control of the actuators. A similar method can be used to decouple the position sensors. Prior art methods treated cross-coupling between focus, tracking and sled control loops as noise and therefore increased the bandwidth of the system in order to provide compensation. In general, the more noise a system must compensate for the greater the cost of the system. In one embodiment, the present disclosure decouples the actuators using a software algorithm executed by a processor that is part of the optical drive that also contains the OPU, thereby providing better performing optical disk drives. The cross-coupling effects are measured, a decoupling matrix is determined, and the output of the control laws are modified so as to decouple the actions of the actuators (and/or sensors). It will be appreciated that various hardware implementations such as logic or state machines can also be used to decouple the actuators.

Figure 1:
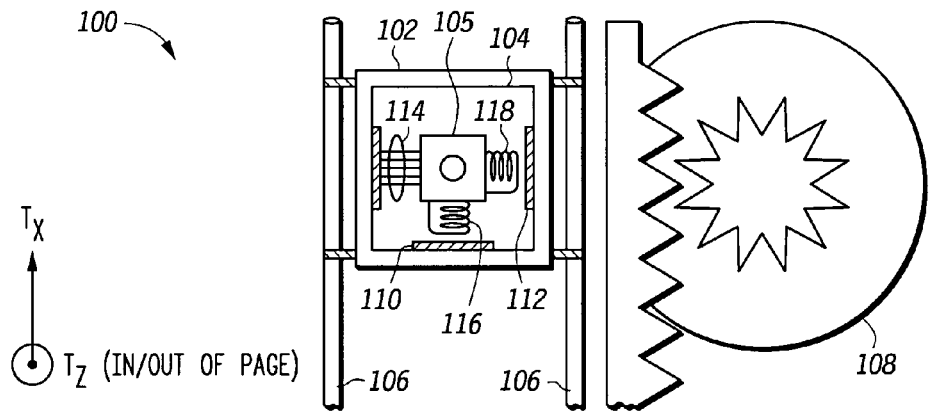
FIG. 1, labeled prior art, illustrates a portion of an optical disk drive.
Figure 2:
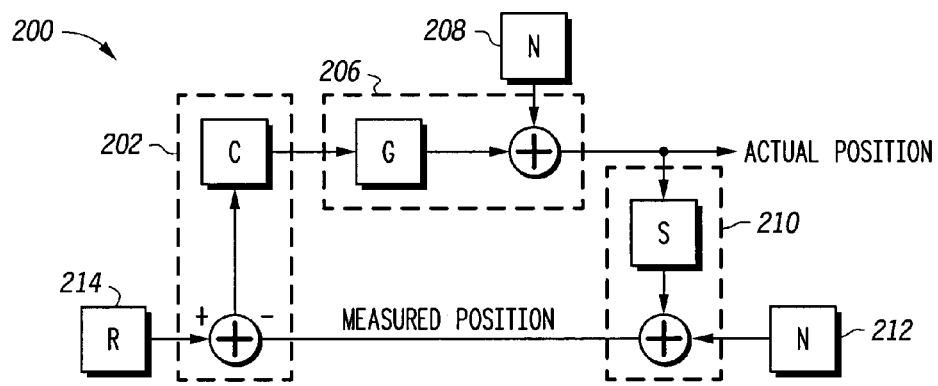
FIG. 2, labeled prior art, illustrates a system model for one of multiple servo systems of an optical disk drive.
Figure 3:
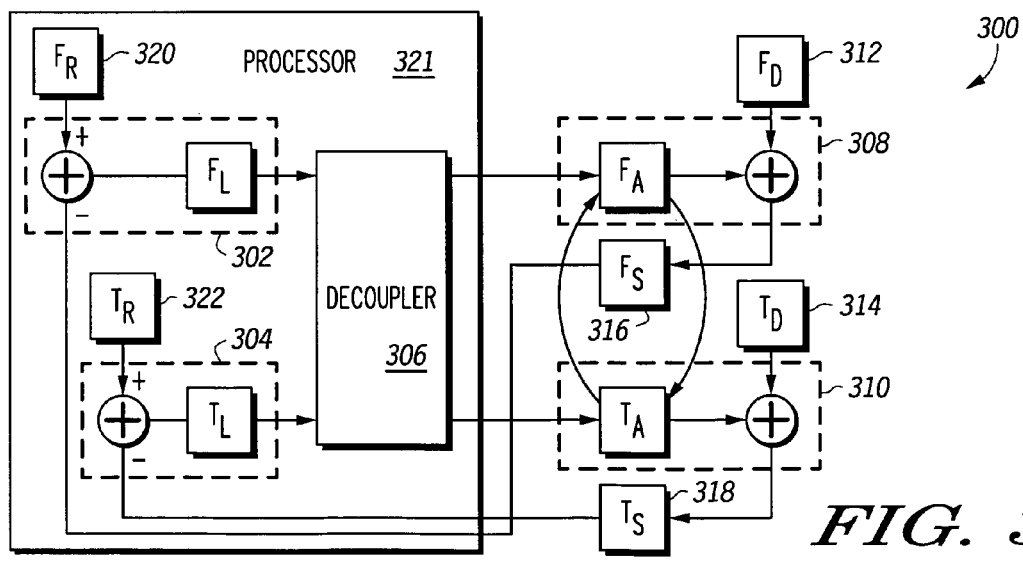
FIG. 3 illustrates a system model for an optical pickup unit according to an embodiment of the present disclosure.

FIG. 3 illustrates a system model 300 of an optical pickup unit according to an embodiment of the present disclosure. Focus control law 302 and tracking control law 304 produce focus controls and tracking controls, respectively. A decoupler 306 produces a modified focus control and a modified tracking control from the focus and tracking controls, respectively. The modified focus controls are input to a focus actuator 308 and the modified tracking controls are input to a tracking actuator 310. Focus actuator 308 and tracking actuator 310 move the lens assembly according to the modified controls. Any focus disturbance 312 is added to the output of focus actuator 308 forming the actual focus position. Any tracking disturbance 314 is added to the output of tracking actuator 310 forming the actual tracking position. The actual focus position is sensed by focus sensor 316 and the sensed focus position is subtracted from a reference focus position 320 and given to focus laws 302. Tracking sensor 318 senses the actual tracking position and the sensed tracking position subtracted from a reference tracking position 322 and is given to tracking laws 304. Note that sensors 318 and 316 can receive noise components (not shown), similar to element 212 of FIG. 2, for which similar decoupling techniques as described herein can be applied.

Decoupler 306 performs a matrix multiplication on the focus controls from focus control law 302 and the tracking controls from tracking control law 304. For example, if $F_1$ represents the focus controls, $T_1$ represents the tracking controls, and decoupler 306 includes decoupling matrix Q:

$$Q = \begin{bmatrix} j_1 & -k_1 \\ -k_2 & j_2 \end{bmatrix}$$

then the modified focus controls are equal to $(j_1 F_1 - k_1 T_1)$ and the modified tracking controls are equal to $(j_2 T_1 - k_2 F_1)$. Hereinafter, it is illustrated that $j_1$ and $j_2$ can be approximated quite accurately as one. The determination of $k_1$ and $k_2$ are also illustrated hereinafter. The terms of matrix Q are configured so as to compensate for cross-coupling between the focus and tracking actuators such that focus controls from focus laws 302 only minimally affect the resulting actual tracking position of the optical pickup unit and the tracking controls from tracking laws 304 only minimally affect the resulting actual focus position of the optical pickup unit.

For simplicity of illustration, note that in system model 300, only focus and tracking actuator disturbances are modeled. Cross-coupling between the tracking and focus sensors, and cross-coupling from sled disturbances to the tracking actuator are not illustrated. These cross-couplings can additionally be decoupled according to an embodiment of the present disclosure.

Focus control laws 302, tracking control laws 304, and decoupler 306 are illustrated as part of processor 321 and can be implemented as software algorithms. In an alternative embodiment, these control laws can be implemented with other circuitry, such as application specific devices, which can include analog or digital logic, electro-mechanical circuits, state machines, mechanical, or other such devices.

Figure 4:
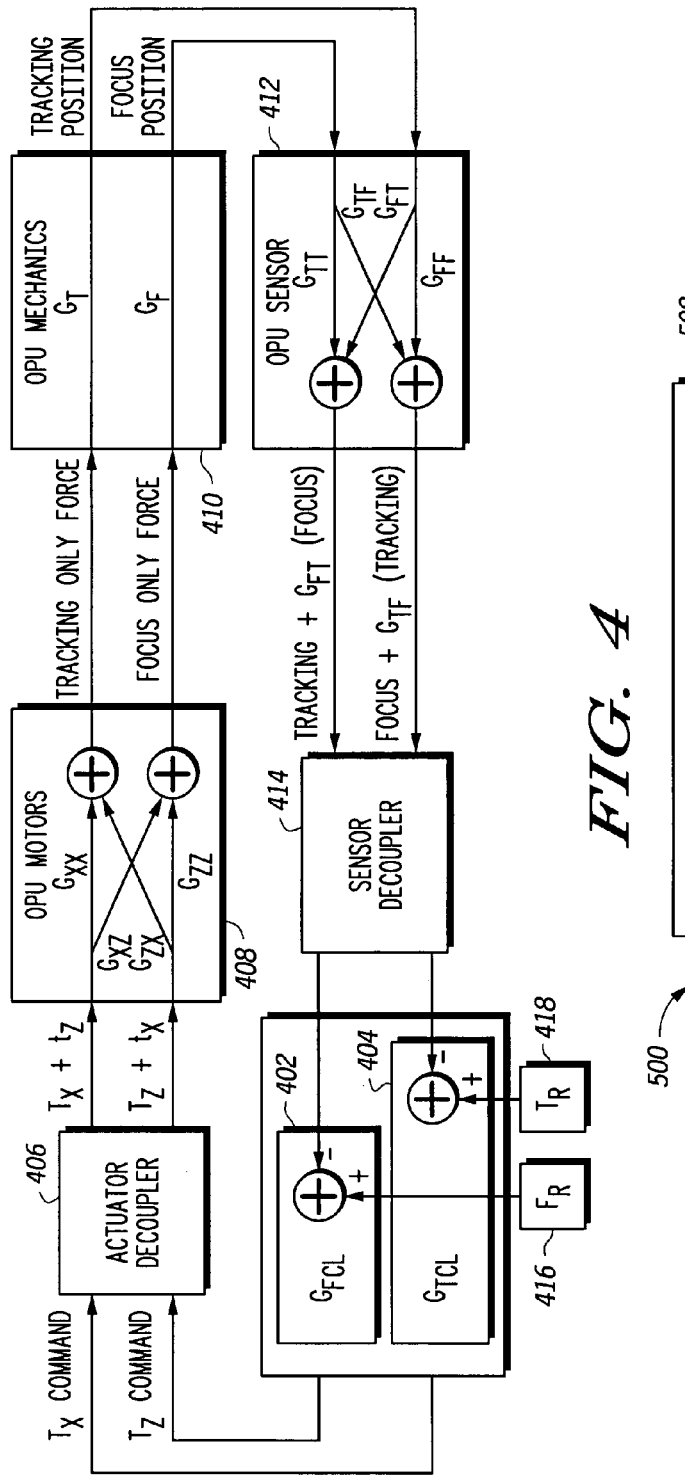
FIG. 4 illustrates a control loop block diagram for an optical pickup unit according to an embodiment of the present disclosure.

FIG. 4 illustrates a control loop block diagram of an optical disk drive according to an embodiment of the present disclosure. Focus control law 402 and tracking control law 404 produce focus controls (Tz command) and tracking controls (Tx command), respectively. The focus controls are modified by actuator decoupler 406 producing modified focus controls having a focus component (Tz) and a tracking decoupling component (tx). The tracking controls are modified by actuator decoupler 406 producing modified tracking controls having a tracking component (Tx) and a focus decoupling component (tz). Tracking decoupling component tx and focus decoupling component tz compensate for the effects of cross-coupling in optical pickup unit lens motors 408. In one type of system analysis and modeling technique, the optical pickup unit lens motors 408 can be modeled as a set of transfer functions. The modified tracking controls are input to transfer functions $G_{XX}$ and $G_{XZ}$, and the modified focus controls are input to transfer functions Gzz and Gzx. The outputs of Gxx and Gzx combine to provide the desired tracking only action (force or torque). The outputs of Gzz and Gxz combine to provide the desired focus only action (force or torque). Because the cross-coupling effects $G_{ZX}$ and $G_{XZ}$ have been compensated for by the decoupler 406, optical pickup unit lens motors 408 provide a substantially tracking only action and a substantially focus only action to optical pickup unit mechanics 410 to produce the desired actual tracking and focus positions. Optical pickup unit sensor 412 senses the actual tracking and focus position, but due to cross-coupling in optical pickup unit sensor 412, the measured tracking position includes a tracking component ($G_{TT}$) and a focus cross-coupling component ($G_{FT}$) and the measured focus position includes a focus measurement ($G_{FF}$) and a tracking cross-coupling component ($G_{TF}$). A sensor decoupler 414 receives the measured positions and decouples the measured positions, producing substantially focus only data and substantially tracking only data which are subtracted from a reference focus position 416 and a reference tracking position 418, respectively, for focus control laws 402 and tracking control laws 404. Note that disturbance and noise components have been removed to simplify the drawing of FIG. 4.

Actuator decoupler 406 is designed such that the Tz+tx signal passing through optical pickup unit lens motors 408 has the effect of producing substantially only excitation of the focus loop and the Tx+tz signal has the effect of producing substantially only excitation of the tracking loop. Sensor decoupler 414 is designed such that the tracking input is removed, that is, decoupled from the focus loop and the focus input is removed from the tracking loop.

For ease of illustration, FIG. 4 may seem to imply that the forces resulting from the decoupling action are orthogonal. However, the forces may not be orthogonal. The forces can include both such that the resulting movement compensates for the lack of orthogonality in the motion of the actuators.

Figure 5:
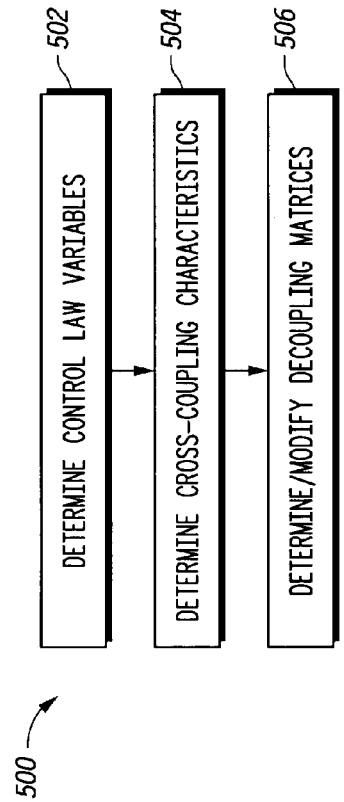
FIG. 5 illustrates a flow diagram of optical disk drive decoupling according to an embodiment of the present disclosure.

FIG. 5 illustrates a flow diagram 500 of configuring an optical disk drive in accordance with the present disclosure. Control law variables of the system are determined, step 502. For example, measurements can be made to determine the amount of current required to move the actuator a specified amount in the tracking direction, the frequency response of the device, and various non-linearities. These and other factors can be measured and considered when setting a variable, such as a gain coefficient, of the control laws of the system. In accordance with the present embodiment, the amount of disturbances and noise that the control laws will need to compensate for is reduced since cross-coupling of actuators is being compensated for by decouplers instead of by the control laws. Therefore, the robustness of the control laws and the complexity of the required hardware needed to implement the control laws is reduced. Control law variables can be stored in memory resident on the CPU, or by any other means. Cross-coupling characteristics, i.e., cross-coupling matrices, of the system are determined, step 504. For example, a measurement quantifying the effects of tracking commands on the focus position can be made by providing a tracking command to a tracking actuator and a known circuit (for example, a known simple regulator) to the focus actuator and measuring results on the focus position. These and other cross-coupling effects can be measured and stored. These measurement and storage operations can be performed with test articles, during manufacture of the drive or during operation of the drive. One or more decoupling matrices are determined or modified, step 506. Upon first use, the decoupling matrices can be generated. Upon subsequent use, the decoupling matrices can be modified according to, for example, a changed environment, changed characteristics of the optical disk drive, start-up of the drive, monitoring of internal signals, or other such events. The calculations to determine/modify the decoupling matrices is illustrated hereinafter. In use, the control commands output from the control laws are multiplied by the decoupling matrix terms to compensate for the effects of cross-coupling. Additionally, a decoupling matrix can be used to modify the sensor measurements producing more accurate measurements. Each matrix multiply incurs a minimum of two scalar multiplies and two scalar additions in a real system. Determining the control law variables 502 and determining the cross-coupling characteristics 504 can occur in any order or at the same time according to embodiments of the present disclosure.

Flow 500 can occur during the manufacturing of an optical disk drive, upon system power up and system use, and the like. When performed during manufacturing, initial control laws and decoupling matrices can be determined according to actuator characteristics. By performing decoupling at manufacturing, manufacturing yields can be improved because otherwise out of specification actuators can be used. When determined during system use, for example, once every minute, decoupling can be performed and modified according to changes in the mechanics of the system. For example, actuator coils can have reduced performance over time.

In general, an actuator decoupler matrix Q is determined such that tracking force signal Fx and focus force signal Fz are decoupled from each other.

$$\begin{bmatrix} F_X \\ F_Z \end{bmatrix} = \begin{bmatrix} G_{XX} & 0 \\ 0 & G_{ZZ} \end{bmatrix} \begin{bmatrix} \hat{T}_X \\ \hat{T}_Z \end{bmatrix} = \begin{bmatrix} G_{XX} & G_{ZX} \\ G_{XZ} & G_{ZZ} \end{bmatrix} \begin{bmatrix} Q_{11} & Q_{12} \\ Q_{21} & Q_{22} \end{bmatrix} \begin{bmatrix} T_X \\ T_Z \end{bmatrix}$$

where the T matrix represents the tracking controls (Tx) and the focus controls (Tz) from the control laws, the G matrix represents an approximation of the transfer function including cross-coupling of the optical pickup unit motors, and the $\hat{T}$ matrix represents the decoupled focus and tracking controls.

The general solution for Q is:

$$\begin{bmatrix} Q_{11} & Q_{12} \\ Q_{21} & Q_{22} \end{bmatrix} = \begin{bmatrix} G_{XX} & G_{ZX} \\ G_{XZ} & G_{ZZ} \end{bmatrix}^{-1} \begin{bmatrix} G_{XX} & 0 \\ 0 & G_{ZZ} \end{bmatrix}$$

For Gxx and Gzz>>Gxz and Gzx (the direct component dominates the cross-coupling component):

$$Q \approx \begin{bmatrix} 1 & -G_{ZX}/G_{XX} \\ -G_{XZ}/G_{ZZ} & 1 \end{bmatrix}$$

And therefore:

$$\begin{bmatrix} \hat{T}_X \\ \hat{T}_Z \end{bmatrix} = \begin{bmatrix} 1 & -G_{ZX}/G_{XX} \\ -G_{XZ}/G_{ZZ} & 1 \end{bmatrix} \begin{bmatrix} T_X \\ T_Z \end{bmatrix}$$

Note that $G_{XX}=N_{XX}/D_X$, $G_{ZZ}=N_{ZZ}/D_Z$, $G_{XZ}=N_{XZ}/D_Z$, and $G_{ZX}=N_{ZX}/D_X$. This implies that $G_{ZX}/G_{XX}=N_{ZX}/N_{XX}$ and $G_{XZ}/G_{ZZ}=N_{XZ}/N_{ZZ}$. Because in most cases, N can be accurately modeled as a first order term, a gain constant in many cases, a suitable decoupling filter will in general be a low order filter, and in many cases, can be well approximated with a fixed constant gain term.

$$\begin{bmatrix} \hat{T}_X \\ \hat{T}_Z \end{bmatrix} = \begin{bmatrix} 1 & -N_{ZX}/N_{XX} \\ -N_{XZ}/N_{ZZ} & 1 \end{bmatrix} \begin{bmatrix} T_X \\ T_Z \end{bmatrix} \approx \begin{bmatrix} 1 & -k_1 \\ -k_2 & 1 \end{bmatrix} \begin{bmatrix} T_X \\ T_Z \end{bmatrix}$$

A similar argument and matrix can be constructed for decoupling the sensor dynamics.

Although the present disclosure has been described in relation to focus control loops, tracking control loops and sled control loops, the present disclosure is applicable to other coupled control loops as well, for example, a servo loop to control the speed of the spindle. Additionally, the decoupling of a control loop is applicable to decoupling multiple control loops from each another.

The decoupling of control loops described herein has been simplified by using approximations and matrices to perform linear modifications of control signals. However, the present disclosure includes the broader concept of determining a specific process, that may or may not be linear, and modifying the control signals accordingly to decouple the control loops.

Realizations in accordance with the present disclosure have been described in the context of particular embodiments. These embodiments are meant to be illustrative and not limiting. Many variations, modifications, additions, and improvements are possible. Accordingly plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

What is claimed is:

1. A device comprising:
   a first actuator control law portion comprising an input to receive a representation of a first actuator position, and an output;
   a second actuator control law portion comprising an input to receive a representation of a second actuator position, and an output;
   a first actuator decoupler portion comprising a first input coupled to the output of the first actuator control law portion and a second input coupled to the output of the second actuator control law portion, and an output to provide a signal with decoupling compensation for a first actuator based on the representation of the second actuator position.

2. The device, as recited in claim 1, wherein the first actuator decoupler comprises a linear modification module having an input coupled to the output of the second actuator control law portion, and an output to provide a linearly scaled representation of a value received at its input; wherein the linearly scaled representation is used to provide the signal with decoupling compensation for the first actuator decoupler portion.

3. An optical disk drive comprising:
   a focus control loop;
   a tracking control loop, wherein the focus control loop and the tracking control loop are cross-coupled, wherein a focus control command excites the tracking control loop and a tracking control command excites the focus control loop; and
   a decoupler configured to produce a modified focus control command from the focus control command and the tracking control command, and configured to produce a modified tracking control command based on the tracking control command and the focus control command, wherein the modified focus control command has a different excitation of the tracking control loop than the focus control command and wherein the modified tracking control command has a different excitation of the focus control loop than the tracking control command.

4. The optical disk drive as recited in claim 3, further comprising:
   a lens assembly, wherein the focus loop comprises a focus actuator configured to move the lens assembly in a focus direction.

5. The optical disk drive as recited in claim 3, further comprising:
   a lens assembly, wherein the tracking loop comprises a tracking actuator configured to move the lens assembly in a tracking direction.

6. A method comprising:
   determining, by a processor, cross-coupling characteristics of a focus actuator and a tracking actuator of an optical pickup unit; and
   determining, by the processor, a decoupling matrix to decouple the focus actuator and the tracking actuator.

7. The method as recited in claim 6, further comprising:
   determining a focus control law variable of the focus actuator, the focus control law variable for determining focus control commands for controlling a focus position of an optical pickup unit; and
   determining a tracking control law variable of the tracking actuator, the tracking control law variable for determining tracking control commands for controlling a tracking position of the optical pickup unit.

8. The method as recited in claim 7, wherein determining the focus control law variable comprises:
   determining one or more focus forces to be applied to the focus actuator as the focus control commands; and
   measuring the results of the one or more focus forces on the focus position; and
   determining gain factors relating to the results of the one or more focus forces on the focus position.

9. The method as recited in claim 7, wherein determining the tracking control law variable comprises:
   determining one or more tracking forces to be applied to the tracking actuator as the tracking control commands;
   measuring the results of the one or more tracking forces on the tracking position; and
   determining gain factors relating to the results of the one or more tracking forces on the tracking position.

10. The method as recited in claim 6, wherein determining the cross-coupling characteristics comprises:
    determining one or more focus forces to be applied the focus actuator as the focus control commands;
    measuring the results of the one or more focus forces on the tracking position;
    determining a specific process relating to the results of the one or more focus forces on the tracking position;
    determining one or more tracking forces to be applied to the tracking actuator as the tracking control commands;
    measuring the results of the one or more tracking forces on the focus position; and
    determining another specific process relating to the results of the one or more tracking forces on the focus position.

11. An optical disk drive comprising:
    a lens assembly;
    a focus actuator that is configured to move the lens assembly in a focus direction;
    a tracking actuator that is configured to move the lens assembly in a tracking direction; and
    a decoupler configured to decouple the focus actuator from the tracking actuator by reducing signal cross coupling.

12. The optical disk drive, as recited in claim 11, wherein the decoupler modifies a focus command to have a reduced effect on a tracking position of the lens assembly and modifies a tracking command to have a reduced effect on a focus position of the lens assembly.

13. The optical disk drive as recited in claim 11, wherein the decoupler is a software routine stored on computer readable media.

14. The optical disk drive as recited in claim 11, wherein the decoupler is an analog circuit.

15. The optical disk drive as recited in claim 11, wherein the decoupler is an electro-mechanical circuit.

16. An optical disk drive comprising:
    a processor to determine cross-coupling characteristics of a focus actuator and a tracking actuator, and to determine a decoupling matrix to decouple the focus actuator and the tracking actuator.

17. The optical disk drive, as recited in claim 16, wherein the processor further to determine focus control laws of the focus actuator, the focus control laws for determining focus control commands for controlling a focus position of an optical pickup unit, and to determine tracking control laws of the tracking actuator, the tracking control laws for determining tracking control commands for controlling a tracking position of the optical pickup unit.

* * * * *